United States Patent [19]
Wada et al.

[11] 3,834,482
[45] Sept. 10, 1974

[54] OCCUPANT PROTECTION DEVICE FOR MOTOR VEHICLES AND THE LIKE

[75] Inventors: Akihiro Wada, Chiryu; Shingto Ito, Toyota, both of Japan

[73] Assignee: Toyota Jidosha Kogyo Kabushiki Kaisha, Aichi-ken, Japan

[22] Filed: June 15, 1972

[21] Appl. No.: 263,242

[30] Foreign Application Priority Data
Oct. 20, 1971  Japan.............................. 46-83118

[52] U.S. Cl................. 180/90, 161/68, 280/150 B
[51] Int. Cl....................... B60k 37/00, B60r 21/02
[58] Field of Search....... 180/90; 280/150 R, 150 B, 280/150 AB; 161/68; 29/191.4

[56] References Cited
UNITED STATES PATENTS

| | | | |
|---|---|---|---|
| 2,818,933 | 1/1958 | Tell...................... | 180/90 |
| 3,088,539 | 5/1963 | Mathues et al............. | 280/150 B X |
| 3,195,686 | 7/1965 | Johnson..................... | 29/191.4 X |
| 3,341,248 | 9/1967 | Barenyi et al........................ | 180/90 |
| 3,462,330 | 8/1969 | Greig et al....................... | 161/68 X |
| 3,493,244 | 2/1970 | Bozich............................. | 161/68 X |
| 3,736,004 | 5/1973 | Haruna............................ | 180/90 X |

FOREIGN PATENTS OR APPLICATIONS

| | | | |
|---|---|---|---|
| 618,775 | 3/1961 | Italy....................................... | 180/90 |
| 986,353 | 3/1965 | Great Britain........................ | 161/68 |

OTHER PUBLICATIONS
Washington Star–News, This Week. Mar. 20, 1960, page 23.

*Primary Examiner*—Evon C. Blunk
*Assistant Examiner*—James L. Rowland
*Attorney, Agent, or Firm*—Stevens, Davis, Miller & Mosher

[57] ABSTRACT

An occupant protection device for automotive vehicles including a honeycomb shaped structural member attached to the base of an instrument panel, a pad layer and a fancy covering. The honeycomb shaped structural member has a plurality of hollow cells surrounded by side walls having openings in the direction perpendicular to that of the action of impact force and protects the occupant by permitting the deformation of the member to absorb shock which may be caused by a secondary collision of the occupant with the instrument panel.

2 Claims, 9 Drawing Figures

OCCUPANT PROTECTION DEVICE FOR MOTOR VEHICLES AND THE LIKE

This invention relates to protection devices for occupants of a motor vehicle and the like, and more particularly it is concerned with a protection device for the occupant of a front seat of a motor vehicle adjacent the driver's seat which is adapted to eliminate the danger to the occupant of such seat being thrown against the instrument panel or the like and causing injury at the time of collision, and which is reliable in performance, highly efficient in absorbing shock, easy to mount and low in cost.

Proposals have been made to use various types of occupant protection devices intended to protect the occupants of a motor vehicle including the occupant of the front seat adjacent the driver's seat in case the motor vehicle is involved in a collision, and they include inter alia a gas bag device and hydraulic shock absorbing device. Some disadvantages are associated with these devices of the prior art. The gas bag device is complex in construction and high in cost. Besides, there is some doubt as to whether it operates satisfactorily in the present state of development. The hydraulic shock absorbing device is also high in cost and has some problems which must be obviated to enable the device to function in a stable manner under any condition.

Accordingly, an object of this invention is to provide an occupant protection device for a motor vehicle and the like forming a part of the instrument panel of the motor vehicle. The device undergoes plastic deformation and structural deformation and performs a shock absorbing operation in a stable manner when the force of impact acting in the direction of movement of the motor vehicle to which the instrument panel is subjected as the occupant is thrown thereagainst at the time of collision exceeds a predetermined level so as to positively and readily provide protection to the occupant, and is simple in construction, easy to mount and low in cost.

Another object of the invention is to provide an occupant protection device for a motor vehicle and the like which is adapted to provide better protection to the occupant by absorbing the shock of impact when the face or other vital part of the occupant is thrown against the upper surface of the instrument panel as the force of impact acting in the direction of movement of the motor vehicle is produced.

Additional and other objects as well as features and advantages of the invention will become evident from the description set forth hereinafter when considered in conjunction with the accompanying drawings, in which.

Figure 1:
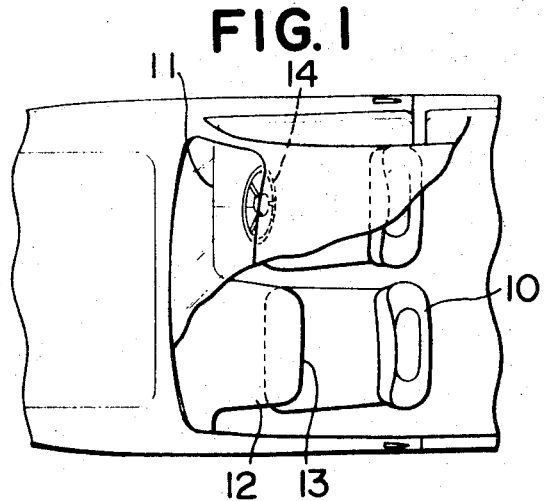
FIG. 1 is a schematic plan view, with certain parts being cut out, of a front seat portion of a motor vehicle incorporating this invention therein.
Figure 2:
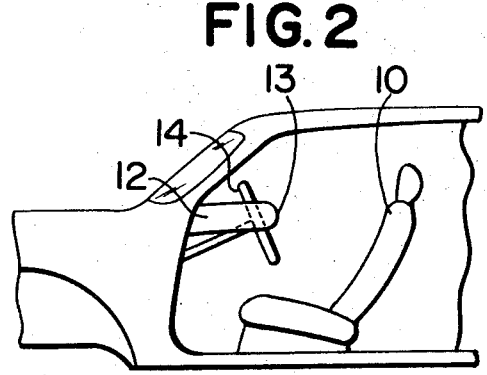
FIG. 2 is a schematic side view of FIG. 1.

In FIG. 1 to FIG. 4, there is shown one embodiment of this invention which comprises a hollow member 12 attached to a section of an instrument panel 11 facing the front seat portion of a motor vehicle which is juxtaposed to a seat 10 adjacent the seat of the driver, such hollow member 12 projecting toward the occupant of such seat and having a front surface 13 disposed near the breast of the occupant and substantially in the same position as the steering wheel 14.

Figure 3:
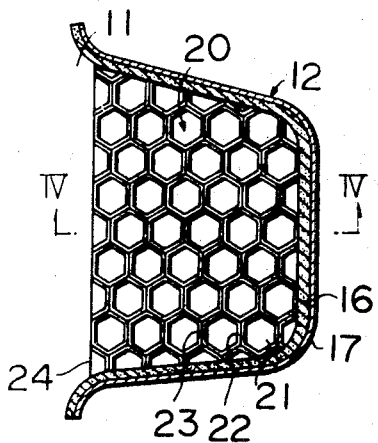
FIG. 3 is a plan view of one form of honeycomb-shaped structure.
Figure 4:
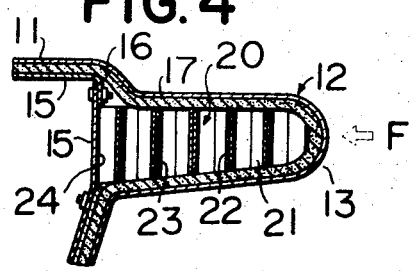
FIG. 4 is a sectional view taken along the line IV—IV of FIG. 3.

As shown in FIG. 3 and FIG. 4, the hollow member 12 attached to the instrument panel section juxtaposed to seat 10 comprises a honeycomb-shaped structure 20 firmly secured to a base 15 of the instrument panel, and a pad 16 fitted over the outer surface of honeycomb-shaped structure 20 to absorb shock.

Honeycomb-shaped structure 20 is composed of a multitude of hexagonal hollow cells 21 arranged such that a side wall 22 of each cell 21 is disposed on the side of the occupant of seat 10 or the open top and bottom of each cell 21 are directed vertically as shown in FIG. 4, so that each side wall 21 is disposed normal to the direction in which a force of impact F acts.

The honeycomb-shaped structure may be formed of an iron plate or a light metal alloy plate and its walls defining cells may be made separately and connected together adhesively, by welding, by riveting or by means of bolts. Alternatively, the honeycomb-shaped structure may have its cell defining walls formed integrally by aluminum or other light metal or a foamed or non-foamed plastic.

Honeycomb-shaped structure 20 may be fixed at a rear surface 24 thereof to a front surface of the base 15 of instrument panel section as by bolts and nuts.

The pad 16 fitted over the outer surface of hollow member 12 may be made of a foamed plastic and have a greater thickness at its front surface 13 and a smaller thickness at the other portions thereof. A suitable fancy covering 17 made as of synthetic leather may be provided on the entire surfaces of instrument panel 11 and hollow member 12 to be disposed on pad 16.

The honeycomb-shaped structure 20 constituting the hollow member 12 attached to the section of instrument panel 11 facing seat 10 and serving as a shock absorber means may be disposed to cover the entire surface of instrument panel 11 without adversely affecting in any way the structural relationship of the components of the vehicle. Honeycomb-shaped structure 20 has been shown and described as comprising a multitude of hollow hexagonal cells, but the invention is not limited to this form of honeycomb-shaped structure.

Figure 5:
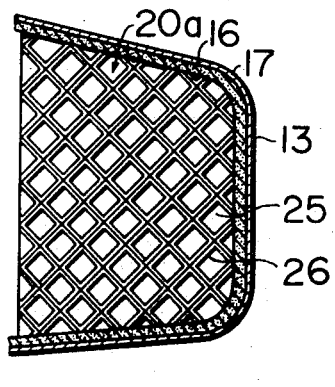
FIG. 5 and FIG. 6 are sectional views of different forms of honeycomb-shaped structure.
Figure 6:
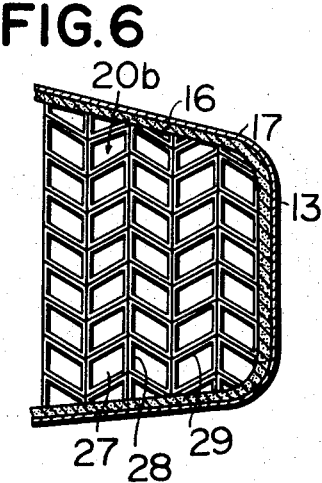

This invention covers a honeycomb-shaped structure 20a comprising a multitude of square hollow cells 25 defined by side walls 26 and arranged closely such that each cell 25 is disposed obliquely with respect to the direction in which the force of impact F acts as shown in FIG. 5. A honeycomb-shaped structure 20b comprising a multitude of diamond-shaped hollow cells 27 defined by side walls 28 disposed normal to the direction in which the force of impact F acts and side walls 29 disposed obliquely with respect to the direction in which the force of impact F acts is also covered by this invention.

It is to be understood that the aforementioned several honeycomb-shaped structures are shown for illustration purposes only and that the invention is not limited thereto. Honeycomb-shaped or similar structures comprising a multitude of hollow cells of triangular, cylindrical or other shape are also covered by this invention.

Assuming that the motor vehicle incorporating this invention is involved in a collision and the occupant of seat 10 is thrown forwardly by inertia, the trunk and lower extremities of the occupant are kept by a knee pad (not shown) from being forced into a space beneath instrument panel 11 while the breast of the occupant is thrown against the front surface 13 of the hollow member 12 having built therein the honeycomb-shaped structure 20 which serves as a shock absorber means as aforementioned. If the force of impact with which the occupant crushes against hollow member 12 exceeds a predetermined level, composite walls 23 each composed of the side walls 22, 22 of adjacent hexagonal hollow cells 21 will undergo plastic deformation and the angles formed by the side walls 22 of each cell 21 will be changed so that each cell 21 is deformed, thereby absorbing the energy of shock. More specifically, when honeycomb-shaped structure 20 is subjected to the force of impact F, it is first crushed on the front surface 13 side and gradually undergoes plastic deformation in its entirety so as to increase the area in which it bears the force of impact. Thus, the energy of shock is absorbed with an increasingly greater capacity by the shock absorber means, so that the danger of the body of the occupant being suddenly thrusted forwardly and the upper breast and head of the occupant being thrown against various parts mounted in the front portion of the vehicle can be prevented.

Any articles as desired may be placed on the hollow member 12 attached to instrument panel 11 as a part thereof according to this invention as on any instrument panel of the prior art, or the occupant of seat 10 may put his or her hand on the hollow member 12 in getting into or out of the vehicle without causing any damage to its honeycomb-shaped structure or interfering with its operation.

The embodiment shown and described hereinabove is effective to absorb a linear force of impact directed in the direction of movement of the vehicle and to preclude injury which the occupant of seat 10 might otherwise suffer at the time of collision. However, since honeycomb-shaped structure 20 offers a high degree of resistance when a force vertically directed lengthwise of side walls 22 is exerted thereon, the occupant of seat 10 may suffer severe injury if the occupant's head or face is thrown against the upper surface of hollow member 12 at the time of collision.

Figure 7:
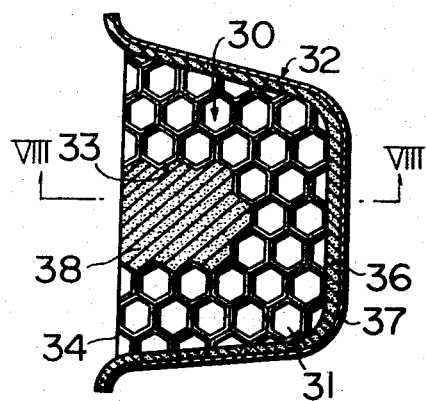
FIG. 7 is a sectional view of another form of honeycomb-shaped structure.
Figure 8:
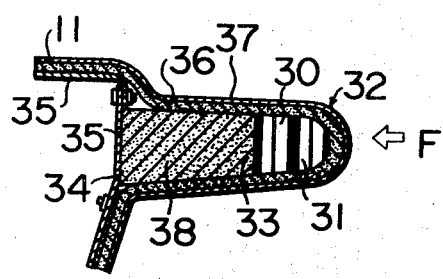
FIG. 8 is a sectional view taken along the line VIII—VIII of FIG. 7.

FIG. 7 and FIG. 8 show another embodiment which is provided with a view to precluding injury of this type. There is shown a hollow member 32 which comprises a honeycomb-shaped structure 30 made of iron plate, light metal plate or plastic as is the case with the honeycomb-shaped structure of the first embodiment. However, the honeycomb-shaped structure of the second embodiment is distinguished from the counterpart of the first embodiment by the fact that the former has a cut-out portion 33 of a suitable area disposed along a substantially middle portion of a rear surface 34 of the structure so that the hollow cell portion of the honeycomb-shaped structure may be substantially in the form of a letter U in a sectional view in FIG. 7. A buffer 38 made for example of foamed polyurethane is embedded in cutout portion 33.

Honeycomb-shaped structure 30 is firmly secured at its rear surface 34 to a base 35 of the instrument panel as by bolts and nuts. A pad 36 is fitted over an outer surface of honeycomb-shaped structure 30 and a fancy covering 37 made as of synthetic leather is provided over pad 36. Thus, hollow member 32 forming a part of the instrument panel of a motor vehicle projects rearwardly toward a front seat of the motor vehicle adjacent the driver's seat and its front surface is disposed near the breast of the occupant.

If the occupant of the front seat adjacent the driver's seat of a motor vehicle is dozing when the motor vehicle is involved in a collison, he or she will be unable to assume of posture of defense at once and may hit hard the upper surface of hollow member 32 at the head or face. If the second embodiment of the present invention is incorporated in the motor vehicle, then honeycomb-shaped structure 30 having hollow cells arranged substantially in the shape of a letter U is crushed, when a force of impact exceeding a predetermined level is exerted thereon, in the direction in which such force of impact is directed and undergoes plastic deformation. Thus, the area of honeycomb-shaped structure 30 which bears the force of impact is increased and the capacity thereof to absorb the energy of shock becomes increasingly greater, thereby preventing secondary collision of the occupant with the parts of the motor vehicle. At the same time, the energy of shock of the head or face of the occupant hitting against the upper surface of hollow member 32 is absorbed by buffer 38, so that injury to the vital part of the occupant can be prevented.

In the first and second embodiments, the honeycomb-shaped structures are composed of a multitude of hollow cells of the same shape, irrespective of whether the shape is polygonal or cylindrical. However, the capacity of the honeycomb-shaped structure according to this invention to absorb the energy of shock at the time of collision can be increased by varying the size of the hollow cells and the thickness in the front end, central and rear end portions of the structure or by using different materials for the side walls of the honeycomb-shaped structure defining the hollow cells in these three portions of the structure.

From the foregoing description, it will be evident that the hollow member forming a part of the instrument panel of a motor vehicle according to one embodiment of this invention comprises a honeycomb-shaped or similar structure comprising a multitude of hollow cells of the polygonal or cylindrical shape connected together in an orderly manner. With this arrangement, the honeycomb-shaped or similar structure undergoes plastic deformation and structural deformation when subjected to a force of impact facing a direction which is normal to the side walls of the hollow cells of the structure. Thus, the invention is effective to absorb the energy of shock so as to positively and readily prevent the danger of the occupant of the seat adjacent the driver's seat of being thrown against the hard instrument panel or other parts and suffering injury.

Figure 9:
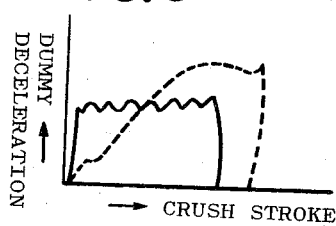
FIG. 9 is a diagrammatic representation of the shock absorbing characteristics of the device according to this invention.

The adjacent hollow cells of the structure have their walls adhering to one another in at least more than two positions, and the walls are uniform in shape and configuration. This arrangement permits the occupant protection device according to this invention to have shock absorbing characteristics which are approximate to theoretical ideal as shown by a solid line curve in FIG. 9. A broken line curve in the figure shows shock absorption characteristics of a conventional occupant protection device utilizing the buckling deformation of an iron plate. A comparison of the two curves shows how high the device according to this invention is in its efficiency in absorbing the energy of shock.

Besides being reliable in performance and high in efficiency, the device according to this invention is simple in construction, easy to mount in a motor vehicle and low in cost.

According to another embodiment of the invention, a buffer is provided in a proper portion of the honeycomb-shaped structure of the first embodiment from which a suitable number of hollow cells are removed. The provision of the buffer is conducive to elimination of the danger of the head or face of the occupant hitting hard the upper surface of the instrument panel and suffering damage at the time of collision by absorbing the energy of shock. Combined with the hollow cells of the honeycomb-shaped structure which undergo plastic deformation, the buffer embedded in the honeycomb-shaped structure is effective to absorb the energy of shock to which the occupant is exposed and provide better protection at the time of collision.

In the two embodiments of this invention, it is possible to vary the dimensions or wall thickness of the hollow polygonal or cylindrical cells of the honeycomb-shaped structure or to cut off the walls of some cells. In the present invention, it is also possible to vary the density of the buffer. This permits control of shock absorbing characteristics of the device to be effected positively and readily.

What is claimed is:

1. An occupant protection device for an automotive vehicle comprising an instrument panel, a honeycomb shaped structural member forming at least a part of the instrument panel and arranged to face the front seats of the vehicle, said structural member projecting toward the occupant of one of said seats to a position substantially in line with the steering wheel of the vehicle and opposite the breast of the occupant, said member including hollow cells having an open top and bottom of each of the cells directed vertically and having walls disposed substantially normal to the direction in which a force of impact acts at the time of collision, a pad layer fitted over said honeycomb shaped structural member, and a fancy covering provided on the entire surface of said instrument panel and said pad layer.

2. An occupant protection device for an automotive vehicle as defined in claim 1 further comprising a buffer associated with said hollow cells, said structural member having a cut-out portion of a U-shaped section substantially within the middle portion of said structural member and extending towards the side opposite the projecting side of said structural member, said buffer being located within said cut-out portion.

* * * * *